Figure 1:
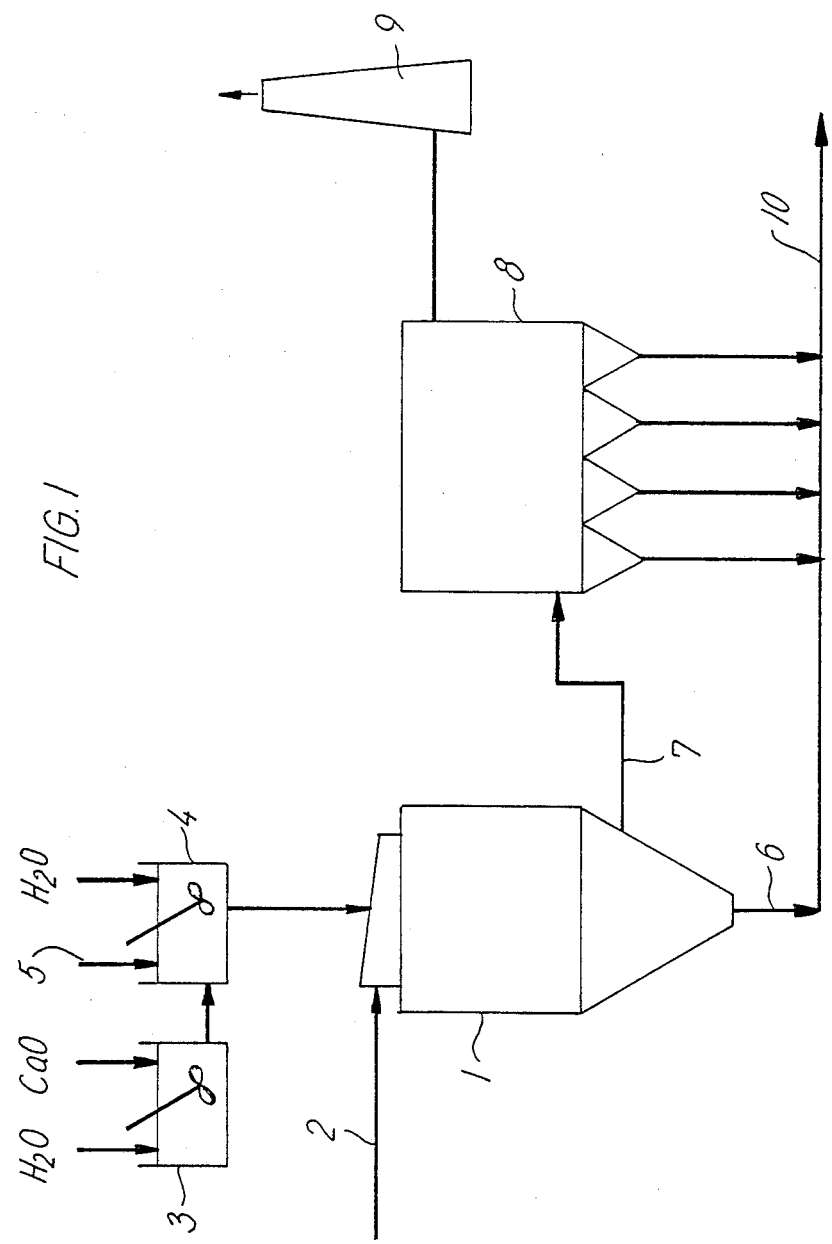

United States Patent [19]

Jøns et al.

[11] Patent Number: 4,789,532
[45] Date of Patent: Dec. 6, 1988

[54] METHOD FOR CLEANING OF A HOT FLUE GAS STREAM FROM WASTE INCINERATION

[75] Inventors: Ebbe S. Jøns, Værløse; Jens T. Møller, Allerød; Kirsten K. Nielsen, Holte, all of Denmark

[73] Assignee: A/S Niro Atomizer, Søborg, Denmark

[21] Appl. No.: 2,250

[22] Filed: Jan. 12, 1987

[30] Foreign Application Priority Data

Jan. 17, 1986 [DK] Denmark ............... 235/86

[51] Int. Cl.$^4$ ............ B01D 47/06; B01J 8/00
[52] U.S. Cl. ............ 423/240; 423/210; 423/244; 106/103; 106/117; 106/118
[58] Field of Search ............ 423/240 S, 244 A, 210; 106/85, 103, 117, DIG. 1

[56] References Cited

U.S. PATENT DOCUMENTS

| | | | |
|---|---|---|---|
| 3,634,115 | 1/1972 | Minnick | 106/85 |
| 3,785,840 | 1/1974 | Minnick et al. | 106/118 |
| 3,920,795 | 11/1975 | Selmeczi | 423/242 |
| 4,124,405 | 11/1978 | Quiénot | 106/111 |
| 4,198,380 | 4/1980 | Kobl | 423/242 |
| 4,251,236 | 2/1981 | Fattinger et al. | 55/84 |
| 4,273,747 | 1/1981 | Rasmussen | 423/210 |
| 4,317,806 | 3/1982 | Leisegang | 423/242 |
| 4,341,745 | 7/1982 | Zopff | 423/210 |

FOREIGN PATENT DOCUMENTS

| | | |
|---|---|---|
| 0059214 | 6/1985 | European.Pat. Off. |
| 2408827 | 9/1974 | Fed. Rep. of Germany |
| 2539077 | 3/1977 | Fed. Rep. of Germany |
| 3308927 | 9/1984 | Fed. Rep. of Germany |
| 3126200 | 3/1985 | Fed. Rep. of Germany |

Primary Examiner—H. M. S. Sneed
Assistant Examiner—George R. Fourson
Attorney, Agent, or Firm—Banner, Birch, McKie & Beckett

[57] ABSTRACT

In a method for cleaning of flue gas derived from waste incineration, of the kind which comprises spray drying a lime slurry in the hot flue gas, the amount of active lime used is from 1.5 to 2.5 times larger than the amount reacting with the acidic components of the flue gas; furthermore, ground blast-furnace slag is incorporated in the lime slurry in an amount that is equivalent to 30 to 100% by weight of the amount of calcium salts generated at the flue gas cleaning. An end-product is hereby obtained, which upon admixing with water, forms a concrete-like material with high mechanical strength and great ability to retain the pollutants present therein so that the product is suited for disposal in nature with a minimum risk of polluting water streams and ground water.

7 Claims, 3 Drawing Sheets

METHOD FOR CLEANING OF A HOT FLUE GAS STREAM FROM WASTE INCINERATION

The present invention relates to a method for cleaning of a hot flue gas stream from waste incineration producing an end-product suited for disposal with a minimum risk of environmental pollution.

The present method is of the type that comprises spray drying of a slaked lime slurry in a hot flue gas stream followed by removal of particulate material from the gas obtaining an end-product that contains products of reaction between lime and the components removed from the flue gas together with non reacted lime and fly ash possibly present in the flue gas stream.

This type of flue gas cleaning processes comprises two main groups. The first main group is called spray drying absorption processes, in which a suspension of absorbent is spray dried in the hot flue gas stream, so that absorption of the harmful acidic components takes place in connection with the spray drying and the subsequent removal of particles from the gas stream. A typical process of this type is described for example in Danish published patent application No. 4830/77. The second main group of the processes in question makes use of two stages i.e. wet scrubbing and spray drying in which the aqueous suspension from the wet scrubbing is spray dried in the flue gas stream before this is conducted to the wet scrubbing stage, in other words, the latter process is based on a substantial part of the harmful component absorption taking place during the wet scrubbing. Such two-stage processes are described inter alia in U.S. Pat. Nos. 4,251,236 and 4,198,380 the latter of which, however, is concerned with removal of $SO_2$ only by means of alkali metal carbonates.

Common to the two types of processes is that they end up with a dry particulate end-product, which in principle may be handled and disposed of or utilized by industrial processes more easily than the end-products generated by the regular wet-scrubbing methods.

In the cases where similar cleaning methods involving spray drying are applied to flue gas derived from coal combustion, e.g. from power stations, there are several applications for the end-product obtained as described in e.g. European patent specification No. 59,214 and U.S. Pat. No. 3,634,115.

However, by using the methods in question in connection with cleaning of flue gas from waste incineration plants, an end-product is obtained that cannot be used directly for industrial purposes and disposal of which is problematical. This is partly due to the fact that the fly ash component possibly present in the end-product does not possess puzzolanic properties, and partly that the end-product contains components which on account of their water solubility and/or toxicity are believed to constitute a risk of polluting environments when disposed of, particularly because rain water may leach compounds which involve a potential risk of contaminating ground water or water streams.

It has especially been feared that lead and zinc compounds together with sulphates and chlorides might be leached from these end-products resulting in corresponding water pollution.

The problems associated with disposal of end-products derived from cleaning of flue gas from waste incineration are considerably larger than the problems of disposing end-products derived from cleaning of flue gas from power stations etc., not only because the former type contains a larger amount of toxic components but also because the greater solubility due to the larger chloride contents combined with the lack of puzzolanic properties of the fly ash component possibly present, has the effect that compounds that are undesired in water streams and ground water may be more easily leached.

It has been suggested to add various binders to the end-product derived from cleaning of waste incinerator flue gas with a view to obtain a concrete-like material in which the harmful substances are entrapped so that the risk of their leaching and transfer into water streams and ground water may be reduced.

As binders for this purpose various sulphate-resistant cement forming materials such as aluminate cement and blast-furnace slag have been suggested.

However, it has turned out that even after admixing considerable amounts of these binders, it has not been possible to obtain materials which after hardening are sufficiently resistant to leach as to meet the requirements regarding disposal in particularly critical areas.

It has now turned out that in connection with the use of blast-furnace slag as a binder, an end-product that makes the disposal less risky can be obtained, if it is ensured partly that a certain amount (as specified in further detail below) of slaked lime in excess of the amount of lime reacted during the flue gas cleaning process is present in the end-product, and partly that an efficient mixing of the end-product and blast-furnace slag used as a binder takes place by incorporating the slag into the lime slurry before this is spray dried in the flue gas.

Thus, the present invention relates to a method for cleaning of a hot flue gas stream from waste incineration producing an end-product suited for disposal in nature with a minimum risk of environmental pollution, which method is of the above-mentioned type and is characterized in that (a) the amount of potentially active slaked lime used is from 1.5 to 2.5 times greater than the amount that reacts with the acidic components of the flue gas, and (b) pulverized blast-furnace slag is incorporated in the lime dispersion in an amount that is equivalent to 30 to 100% by weight of the amount of calcium salts generated by the reaction between the acidic components of the flue gas and lime.

The expression "potentially active slaked lime" is used here to describe that part which according to ASTM C 25 for burnt lime is determined as being active.

When the resulting particulate end-product is admixed with water a concrete-like mix is achieved, which sets after 24 hours, and after approximately 3 weeks it has obtained a strength of the magnitude that applies to weaker types of concrete produced from Portland cement.

The hardened product not only possesses high mechanical strength but it has a great ability to retain the harmful metal compounds contained herein so that these only to a very limited degree will be leached by contact with water. The chloride contents of the products are not bound to the same degree, but because the chlorides are incorporated in a mechanically stable structure, a considerable delay in their leaching is obtained.

To use an excess of lime, as prescribed in the process according to the invention, does, of course, involve higher lime costs than if only the amount of lime needed to obtain the required degree of flue gas cleaning were used.

However, the use of an increased amount of lime as defined above, together with the incorporation of blast-furnace slag into the slurry to be spray dried, involves a number of important advantages, besides that of obtaining an endproduct suited for disposal.

Thus, the increased amount of lime and the presence of blast-furnace slag in the slurry result in an increased solids content, which allows the use of a lower outlet temperature of the partially cleaned flue gas from the spray drying absorption chamber. This is due to the fact that the very drying process is facilitated when the solids content of the droplets to be dried is large.

A low outlet temperature from the drying chamber not only results in an efficient reaction between the acidic flue gas components and the lime, but also enhances the efficiency of the process to remove the contents in the flue gas of mercury vapour and mercury compounds together with dioxines, which term is used here, such as usually applied in connection with the description of harmful components in flue gas, to include polychlorinated dibenzodioxines, and dibenzofuranes. Furthermore, the presence of an increased amount of particulate material in the spray dryer absorption chamber during the cooling of the gas improves removal of mercury and dioxines from the gas. Besides, blast-furnace slag like certain other silicate compounds seems to be able to absorb mercury vapour and dioxine.

Finally, the use of an excess of lime will make the process less sensitive to variations in the amount and composition of the flue gas, implying that a rather complicated control system would be superfluous, which would otherwise be needed if the cleaning process were to be carried out primarily with the smallest possible lime consumption.

In this connection it should be underlined that the method according to the invention is developed especially for cleaning of a gas from waste incinerators where absorbent costs are less important than as applies for instance in cleaning of flue gas from power plants.

The feature of adding the blast-furnace slag to the slurry to be spray dried in the flue gas involves—besides the mentioned advantages as to obtaining a stable end-product, and the advantages due to an increased solids content in the slurry—the extra advantage that no admixing of end-product with binders is required, and apparatus for this purpose is consequently made superfluous.

It is preferred to incorporate the blast-furnace slag into the slurry in an amount that is equivalent to 50 to 80% by weight of the amount of calcium salts generated at the reaction between the acidic flue gas components and the lime.

Preferably a blast-furnace slag with an oxides analysis within the following limits is used
$CaO$: 38-45%
$SiO_2$: 26-33%
$Al_2O_3$: 16-22%
$MgO$: 3-8%

As mentioned above fly ash possibly present in the end-product does not contribute to any appreciable degree to its stabilization and to fixation of harmful compounds in the end-product. In certain cases it may, therefore, be advantageous to remove the fly ash from the flue gas before this is led to the spray drying chamber and to wash the fly ash with water so that it can be used for road construction, fill, etc. The resulting polluted wash water can then be used for manufacture of the lime and blast-furnace slag containing slurry to be spray dried, by means of which the harmful pollutants originally present in the flue gas are fixed in the end-product when it is disposed of as a concrete-like material.

On the other hand it has turned out that the presence of even large amounts of fly ash in the end-product does not, as might be expected, unacceptably increase the demand of blast-furnace slag for binding this together because the amount of blast-furnace slag required depends mainly on the contents of calcium salts present in the end-product, which derive from flue gas cleaning, such as calcium chloride, calcium sulphate, calcium sulphite, and calcium fluoride.

Figure 2:
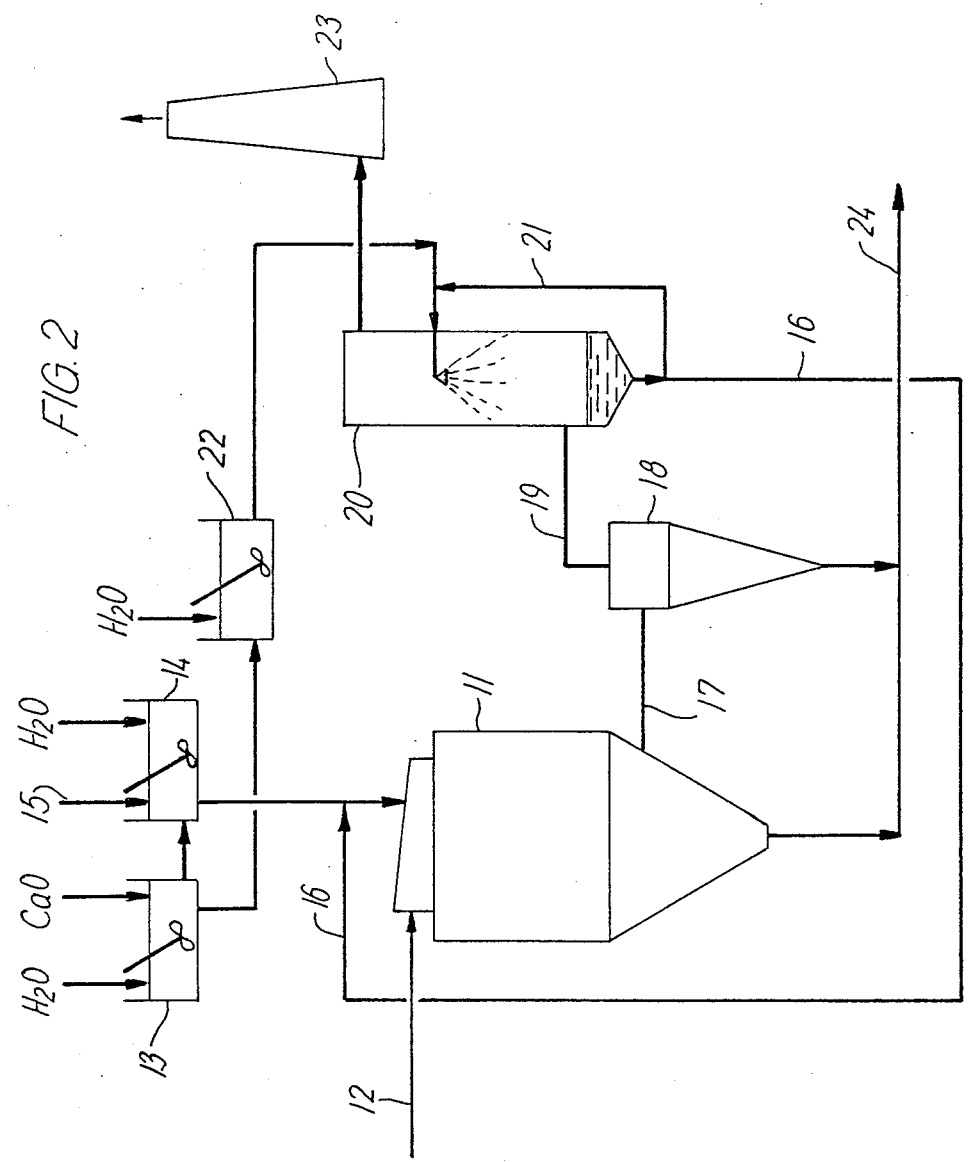
Figure 3:
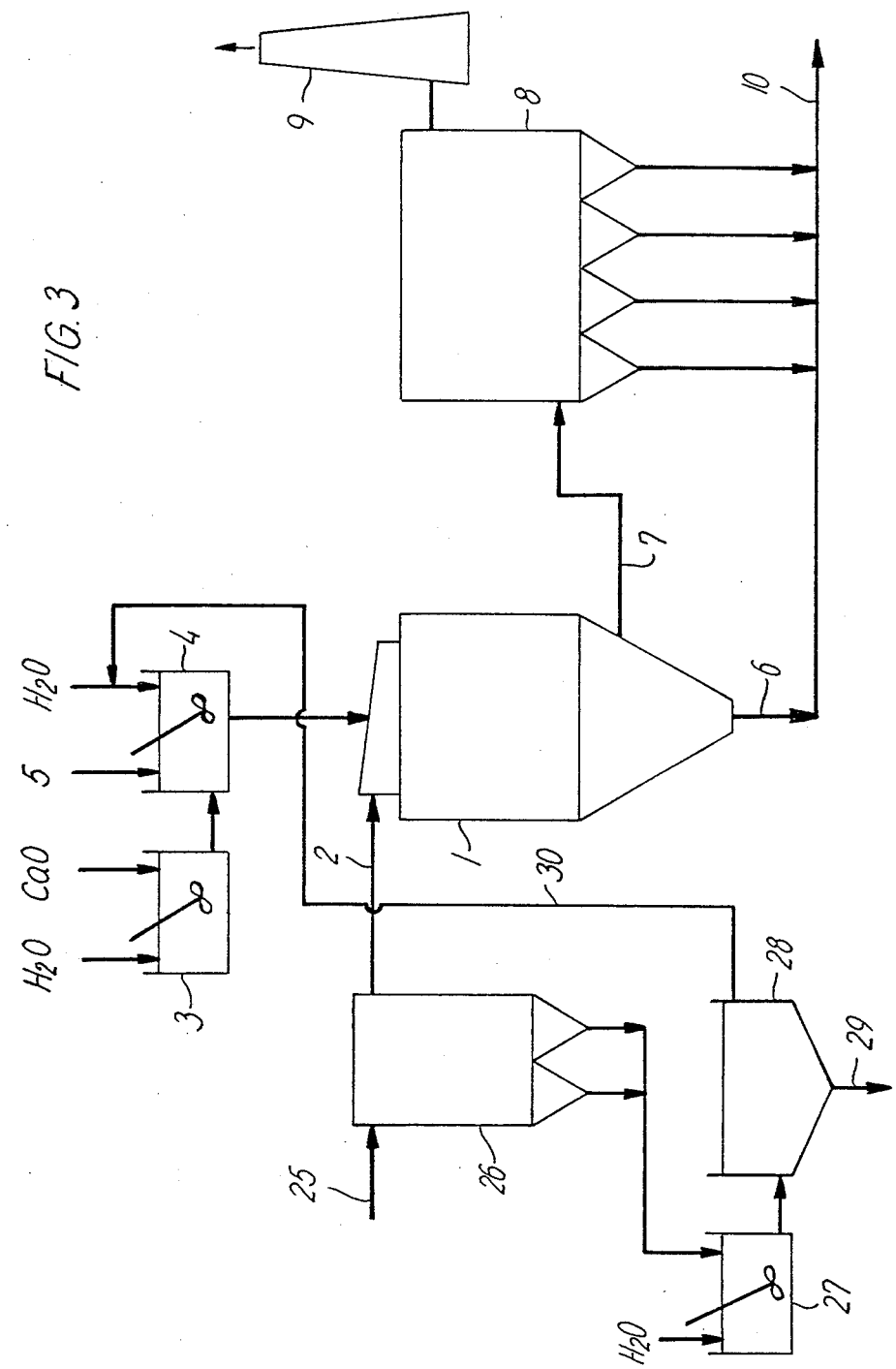

The method according to the present invention is illustrated in more detail in the drawing where FIG. 1 shows the method in accordance with the invention carried out as a spray drying absorption process, and FIG. 2 shows the method in accordance with the invention carried out as combined wet-scrubbing and spray drying, and FIG. 3 shows an embodiment of the method in accordance with the invention in which a spray absorption process, as illustrated in FIG. 1, is used in connection with preceding removal of fly ash.

In FIG. 1 1 designates a spray absorber or a spray dryer to which a hot flue gas stream is passed through duct 2.

Water and burnt lime are passed to a slaker 3 and the slaked lime slurry obtained is conducted to feed tank 4, to which water is added, and comminuted blast-furnace slag is added through a conduit 5. The blast-furnace slag and the lime slurry obtained are used as a feed suspension for the spray dryer 1. The slurry passed to the spray dryer 1 contains typically a total solids content of 8-18%. Since a slurry with such large solids content is dried more easily than a suspension with less solids content not containing any furnace slag and possibly with less lime such as used in the conventional methods, it is possible to operate the spray dryer at lower temperature. For example the gas inlet temperature may be 220°-170° C., and the outlet temperature 80°-125° C.

From the bottom of the spray dryer a part of the dry particulate end-product produced by the reaction is extracted through line 6, which product contains not only unreacted lime and blast-furnace slag together with fly ash, unless separation hereof has taken place before the flue gas is passed to the duct 2, but also calcium salts produced during the absorption reaction and other impurities absorbed from the flue gas.

The remaining part of the end-product is passed with the gas through duct 7 to a particle separator, preferably a bagfilter 8, from which the particle-free gas is passed to a stack 9.

The end-product separated in the particle separator 8 is combined with the end-product removed through the conduit 6, and leaves the plant through conduit 10 in the form of a powder, which just by stirring with water forms a concrete-like material that after hardening will give off harmful compounds to a very limited extent only when in contact with water. The end-product may therefore be deposited without taking any special measures to isolate it from contact with water.

The embodiment of the process shown in FIG. 2 also makes use of a spray dryer 11, to which the gas to be cleaned is passed through duct 12.

Burnt lime is slaked in tank 13, and part of the resulting slaked lime suspension is conducted to a mixing tank 14 where it is diluted with water, and blast-furnace slag is added through conduit 15.

The suspension made up in the tank 14 is used as an additive to an effluent derived from a wet scrubber (further described below) placed downstream of the spray dryer 11 and which effluent is supplied through conduit 16.

As was the case in the embodiment illustrated in FIG. 1 part of the generated end-product is extracted through the bottom of the spray dryer while the remaining part is introduced via line 17 together with the gas stream to cyclone 18, in which a substantial part of the entrained end-product particles is separated. From the cyclone 18 the gas stream is passed via line 19 to a wet scrubber 20 of a design known per se. This wet scrubber may be provided with packing and/or means for removal of dust or drops from the gas. An aqueous slurry is circulated through the wet scrubber 20 through line 21. For neutralization of the acid constituents absorbed by this slurry on contact with the flue gas a slaked lime slurry is introduced from tank 13 after it has been diluted in mixing tank 22 to provide the amount of liquid required for the wet scrubber 20. From the wet scrubber the cleansed gas is passed to stack 23.

It is preferable to limit the amount of lime that is passed to line 21 so that the washing liquid circulating through the wet scrubber is kept neutral or slightly acid.

From the bottom of the wet scrubber 20 a stream of spent slurry is extracted and the part hereof that is not recycled through line 21 is combined via line 16 with the stream of blast-furnace slag and lime-containing slurry from tank 14 to make up the feed slurry that is being introduced into the spray dryer 11.

The end-product obtained from the spray dryer 11 and cyclone 18 exits through line 24 as a disposable product.

While certain known gas cleaning methods, which are based on a two-stage principle similar to that illustrated in FIG. 2, are based on a substantial part of the absorption occurring in the wet scrubber so that the object of the spray dryer is primarily to cool the flue gas and produce a solid end-product, in the method in accordance with the invention very substantial absorption will occur already in the spray drying stage because of the considerable amount of lime present, causing operating conditions in the wet scrubber to become less critical.

In the embodiment shown in FIG. 3 hot fly ash containing flue gas is passed through duct 25 to a particle separator 26 e.g. an electrostatic precipitator in which a substantial part of fly ash in the flue gas is separated and from which the flue gas with considerably reduced fly ash content is passed through duct 2 to spray absorber 1 and, besides, is treated as described in connection with FIG. 1.

The fly ash separated in particle separator 26 contains constituents detrimental to the environment limiting its fields of application. This fly ash is conveyed to mixing tank 27 in which it is mixed with water. Hereby the part of the contents of harmful constituents that is water soluble and therefore particularly critical as far as the environments are concerned is transferred into the aqueous phase.

From the mixing tank 27 the mixture of water and fly ash is passed to a separator 28, e.g. a thickener, a centrifuge or a filter.

From the separator 28 a stream of water is extracted which contains the substantial part of the water-soluble components of the fly ash inclusive of water-soluble metal compounds harmful to the environments.

This aqueous stream is passed through line 30 to the mixing tank 4 mentioned in connection with FIG. 1 and that stream serves to more or less substitute the water addition to tank 4 described in connection with FIG. 1.

The remaining reference numerals in FIG. 3 have the same meaning as the corresponding numerals in FIG. 1.

In the embodiment according to FIG. 3 the water-soluble and for the environment partially harmful components of the fly ash are transferred to the end-product which leaves the plant through 10. In this end-product in which a considerable excess of lime is present, harmful metal compounds will to a large extent be made insoluble and/or they will be bound physically when the end-product hardens to a concrete-like material on disposal.

From separator 28 the fly ash, after having to a considerable extent been freed from water-soluble matter, is taken through line 29. The fly ash thus purified can be used at a considerably reduced risk of ground water polution for a large number of purposes such as road construction and fill where use of fly ash in a non-purified state would be critical due to the risk of ground water pollution.

It will be obvious that the features that characterize the invention may be used in connection with other flue gas cleaning concepts provided only that they comprise spray drying of a slaked lime slurry in the flue gas.

The method in accordance with the invention is illustrated in more detail by means of the following example.

EXAMPLE

A plant as the one outlined in FIG. 1 was used. The gas stream, which was treated, derived from a waste incinerator and it was produced in an amount of 35,000 kg/hour on an average, equivalent to approximately 27,500 Nm$^3$/hour (humid).

The flue gas contained inter alia the following:
$H_2O$: 10 mole %
$O_2$: 10 mole %
Flyash: 73 kg/hour
HCl: 31.6 kg/hour
HF: 0.3 kg/hour
$SO_x$: 11.3 kg/hour The gas temperature at the inlet to the spray absorber 1 was 175° C.

60 kg of burnt lime with an activity of 90%, and 251 kg water were introduced into the slaking tank 3 per hour.

To the mixing tank 4 62 kg/hour ground blast-furnace slag and 314 kg/hour dilution water were introduced so as to make up 664 kg/hour of feed slurry for the spray absorber with a total solids content of 17.6%.

At the exit of the bag filter 8 the HCl contents of the flue gas had been reduced to less than 0.3 kg/hour, the amount of HF was less than 0.05 kg/hour, and the amount of $SO_x$ less than 0.7 kg/hour.

These values are equivalent to the following number of mg/Nm$^3$ calculated on a dry basis:

HCl: less than 5
HF: less than 0.2
$SO_x$: less than 25

The gas temperature at the bag filter outlet was 119° C.

The total amount of end-product taken from the spray absorber and the bagfilter was 237 kg/hour, and it contained:

$Ca(OH)_2$: 10% by weight
$CaCl_2$: 22% by weight
$CaSO_3/SO_4$: 8% by weight
Inert constituents: 3% by weight
Blast-furnace slag: 26% by weight
Fly ash: 31% by weight Samples of the end-product were mixed with water (24% calculated on the weight of the mix) and cast into test specimens. After 24 hours. keeping in a humid atmosphere the strength of the resulting concrete-like product was 3.5 MPa, and after further keeping for 2 weeks the compressive strength was 5.2 MPa.

Specimens were also kept for 2 weeks at room temperature after one day of hardening. These specimens possessed practically the same compressive strength as the specimens that had been completely hardened in air.

To determine the suitability of the method for stabilizing and entrapping water-soluble constituents leaching tests with hardened test specimens were made according to DEV-S4 (Deutsche Einheitsverfahren S4). The composition of the eluate was analyzed after 24 hours and after 312 hours. For comparison, tests were made with leaching of particulate end-product obtained without addition of blast-furnace slag to the absorbent slurry and using an excess of lime equivalent to 20% only. At the latter control test 100 g of powder was stirred into 1 liter of water and kept for 24 hours at room temperature before analyzing.

The results are listed in the table below.

TABLE

|  | End-product obtained by the method in accordance with the invention (hardened) | Conventional end-product (powder) | |
|---|---|---|---|
|  | After 24 hours | After 312 hours | After 24 hours |
| Conductivity | 310 m S/m | 960 m S/m | 3800 m S/m |
| Cl— | 1140 mg/l | 3340 mg/l | 13800 mg/l |
| $SO_2$ | 25 mg/l | 13 mg/l | 970 mg/l |
| Pb | <0.1 mg/l | <0.1 mg/l | 74 mg/l |
| Zn | <0.03 mg/l | <0.05 mg/l | 6.1 mg/l |

It will be seen from the above results that by the method in accordance with the invention, an end-product is obtained in which sulfate, lead and zinc are effectively bound and will be leached by water only to a very limited extent, and that also the chlorides in the end-product, although being easily soluble, will be leached relatively slowly compared with the chloride leaching occurring from the end-products from more conventional flue gas cleaning.

We claim:

1. A method of cleaning a stream of hot flue gas derived from waste incineration to provide an end-product which may be disposed of with a minimum risk of environmental pollution, comprising:

(a) spray drying an aqueous slaked lime slurry containing ground blast-furnace slag in said hot flue gas containing acidic components to produce a particulate end-product which contains the reaction products between said lime and the acidic components removed from the flue gas together with non-reacted lime and any fly ash present in said hot flue gas, wherein said slurry contains an amount of potentially active lime which is from about 1.5 to about 2.5 times larger than the amount of lime necessary to react with said acidic components of said hot flue gas and wherein said ground blast-furnace slag is present in said slurry in an amount equivalent to from about 30 to about 100% by weight of the amount of calcium salts generated by the reaction between said acidic components of said hot flue gas and said lime; and (b) removing said particulate end-product from said gas.

2. The method of claim 1, wherein the amount of said blast-furnace slag incorporated in said slurry is equivalent to 50–80% by weight of the amount of calcium salts generated by the reaction between said acidic components of said flue gas and said lime.

3. The method as in any of claims 1 or 2, wherein the analysis, in weight percent, of said blast-furnace slag, based on oxides, is within the following limits:

CaO: 38–45%
$SiO_2$: 26–33%
$Al_2O_3$: 16–22%
MgO: 3–8%

4. The method of claim 1, wherein said spray drying step is effected in a spray drier absorber chamber and the chamber inlet flue gas temperature is from about 300° to 160° C. and the chamber outlet flue gas temperature is from about 80° to about 140° C.

5. The method of claim 1, wherein the slurry spray dried in step (a) comprises a slurry derived from wet scrubbing of said flue gas subsequent to spray drying of slurry in said flue gas in step (a).

6. The method of claim 1, further comprising the step of removing at least a substantial portion of the fly ash in said flue gas prior to step (a).

7. The method of claim 6, wherein the removed fly wash is washed with water and the resulting wash water is employed, at least in part, to form the slurry which is spray dried in step (a).

* * * * *